United States Patent
Hasegawa et al.

(10) Patent No.: US 8,152,939 B2
(45) Date of Patent: Apr. 10, 2012

(54) NON-HEAT TREATED CONNECTING ROD AND METHOD OF MANUFACTURING THE SAME

(75) Inventors: Tatsuya Hasegawa, Kitakyushu (JP); Zenji Iida, Wako (JP); Kentaro Takada, Wako (JP)

(73) Assignees: Sumitomo Metal Industries, Ltd., Osaka (JP); Hondo Motor Co., Ltd., Tokyo (JP)

( * ) Notice: Subject to any disclaimer, the term of this patent is extended or adjusted under 35 U.S.C. 154(b) by 1862 days.

(21) Appl. No.: 11/221,853

(22) Filed: Sep. 9, 2005

(65) Prior Publication Data

US 2006/0000088 A1      Jan. 5, 2006

Related U.S. Application Data

(63) Continuation of application No. PCT/JP2004/003439, filed on Mar. 15, 2004.

(30) Foreign Application Priority Data

Mar. 18, 2003   (JP) ................................. 2003-072949

(51) Int. Cl.
  *C22C 38/00*      (2006.01)
  *C21D 8/00*       (2006.01)
(52) U.S. Cl. ........................................ 148/333; 148/649
(58) Field of Classification Search .................. 148/400, 148/320, 333; 420/8, 87, 88, 104, 126, 127, 420/128
See application file for complete search history.

(56) References Cited

U.S. PATENT DOCUMENTS

| 5,135,587 | A | 8/1992 | Olaniran et al. |
| 5,922,145 | A | 7/1999 | Watari et al. |
| 6,143,242 | A | 11/2000 | Takada et al. |

FOREIGN PATENT DOCUMENTS

EP      0 856 590 A2 *   8/1998

(Continued)

OTHER PUBLICATIONS

ASM Handbooks Online, vol. 8: Mechanical Testing and Evaluation, Hardness Conversion for Steels, ASM International, 2003. (12 pages total).*

*Primary Examiner* — Scott Kastler
*Assistant Examiner* — Vanessa Luk
(74) *Attorney, Agent, or Firm* — Clark & Brody

(57) ABSTRACT

A non-heat treated connecting rod which comprises, by mass %, C: 0.25-0.35%, Si: 0.50-0.70%, Mn: 0.60-0.90%, P: 0.040-0.070%, S: 0.040-0.130%, Cr: 0.10-0.20%, V: 0.15-0.20%, Ti: 0.15-0.20% and N: 0.002-0.020%, and the balance Fe and impurities, with chemical compositions being less than 0.80 in the value of C+(Si/10)+(Mn/5)+(5Cr/22)+1.65 V−(5S/7) using the symbol of the element as its content, the microstructure of the Big end of the said connecting rod being ferrite-pearlite, all-region hardness of the said big end being 255 to 320 in Vickers hardness, the ferrite-region hardness in the said ferrite-pearlite of the Big end being 250 or more in Vickers hardness and the ratio of the said ferrite-region hardness to the said all-region hardness of the said Big end being 0.80 or more, is excellent in machinability, fracture splitting ability, and fatigue resistance, although no Pb at all is added. Therefore, this non-heat treated connecting rod can be utilized as a low cost type connecting rod in automobile engines or the like.

2 Claims, 2 Drawing Sheets

FOREIGN PATENT DOCUMENTS

| | | |
|---|---|---|
| EP | 0 922 783 A1 | 6/1999 |
| EP | 1 069 198 A1 | 1/2001 |
| EP | 1 243 665 A1 | 9/2002 |
| JP | 09-003589 | 1/1997 |
| JP | 09-031594 | 2/1997 |
| JP | 9-53142 | 2/1997 |
| JP | 09-111412 | 4/1997 |
| JP | 09-176785 | 7/1997 |
| JP | 09-176786 | 7/1997 |
| JP | 09-176787 | 7/1997 |
| JP | 9-194999 | 7/1997 |
| JP | 9-195000 | 7/1997 |
| JP | 10-324949 | 12/1998 |
| JP | 11-029842 | 2/1999 |
| JP | 11-050184 | 2/1999 |
| JP | 11-199967 | 7/1999 |
| JP | 11-199968 | 7/1999 |
| JP | 11-236643 | 8/1999 |
| JP | 11-286746 | 10/1999 |
| JP | 11-286750 | 10/1999 |
| JP | 11-302778 | 11/1999 |
| JP | 11-315340 | 11/1999 |
| JP | 2000-73141 | 3/2000 |
| JP | 2000-345298 | 12/2000 |
| JP | 2002-256394 | 9/2002 |

* cited by examiner

NON-HEAT TREATED CONNECTING ROD AND METHOD OF MANUFACTURING THE SAME

This application is a continuation of the international application PCT/JP2004/003439 filed on Mar. 15, 2004, the entire content of which is herein incorporated by reference.

FIELD OF THE INVENTION

The present invention relates to a non-heat treated connecting rod and a method of manufacturing the same, and more specifically relates to a non-heat treated connecting rod excellent in machinability, fracture splitting ability and fatigue resistance and suitable for a connecting rod in automobile engines or the like; and a method of manufacturing the same.

BACKGROUND OF THE INVENTION

A connecting rod [1] shown in FIG. 1, which is a part of an automobile engine or the like, was made and connected to a complicated shaped crankshaft by the following process. A connecting rod body [2] and a connecting rod cap [3] were separately hot forged. They were subjected to thermal refining of "quenching and tempering", boring of holes for bolts, finishing shaping, and finally assembling them by use of bolts [4] to connect the crankshaft.

However, due to recent severe economical conditions, the trend of reducing manufacturing costs in automobile's parts manufacturing reaches even in the region of the automobile's engine parts manufacturing. Thus, the demand for a non-heat treated connecting rod, which is not required in the thermal refining of "quenching and tempering" of the high manufacturing cost, has increased. Accordingly, in certain kinds of automobiles, a non-heat treated connecting rod has been adopted, which uses a steel which contains by mass %, 0.35% C-0.4% Si-0.95% Mn-0.04% S-0.5% Cr-0.1% V as basic chemical compositions. However, this non-heat treated connecting rod also needs the following conventional process. A connecting rod body [2] and a connecting rod cap [3] are separately hot forged. They are subjected to boring of holes for bolts, finishing shaping, and finally assembling them by use of bolts [4] to connect a crankshaft. Therefore the process of manufacturing of such a non-heat treated connecting rod are not satisfied to reduce the cost compared with a "fracture splitting connecting rod" which will be described later.

In recent years, in order to reduce manufacturing costs further, in addition to developing a non-heat treated steel for a connecting rod, the "fracture splitting connecting rod" manufactured by a following process are being considered. Both a connecting rod body part [2] and a connecting rod cap part [3] are formed integrally (in one body) by hot forging. It is "fracture split" (in other words, "fracture splitting") at a Big end [5] into a connecting rod body [2] and a connecting rod cap [3].

For the above-mentioned "fracture splitting" treatment, a method of inserting a jig into the holes of the Big end [5] (e.g. N portions in FIG. 1) which are portions to be split of the integral forged materials, and loading a stress on the Big end to fracture by way of the jig, can be applied.

If the fracture surfaces are smooth and brittle in a fracture split connecting rod [1] ("a fracture splitting connecting rod"), the connecting rod body [2] and the connecting rod cap [3] can be assembled to connect a crankshaft properly, only by sandwiching a crankshaft between the connecting rod body [2] and the connecting rod cap [3] and connecting them with bolts in the state of putting their fracture surfaces together.

Therefore, if the fracture surfaces of the fracture splitting connecting rods are smooth and brittle, the machining process of the fracture surfaces of the connecting rod body and the connecting rod cap between which the crankshaft is sandwiched, is not needed, thereby reducing the manufacturing cost. Further, since the connection of the connecting rod body and the connecting rod cap are performed by fracture surfaces, an excellent rigid connection that also has excellent strength can be obtained.

With the above-mentioned fracture splitting connecting rod, a non-heat treated steel containing C (Carbon) of about 0.7% by mass as a material, disclosed in U.S. Pat. No. 5,135,587, has been actually used in Europe. However, this non-heat treated connecting rod used in Europe has inferior machinability compared to a conventional heat treated connecting rod with "carbon steels for machine structure use", because of a high content of C. Thus, the non-heat treated connecting rod does not necessarily comply with a demand of the industry which prefers enhancing the machinability for bolt hole processing. Further, the non-heat treated connecting rod used in Europe is inferior in the fatigue limit ("fatigue limit" is hereinafter referred to as "fatigue strength" and is expressed by a mark of $\sigma w$), compared to a conventional heat treated connecting rod with "carbon steels for machine structure use" and the aforementioned non-heat treated connecting rod, contains 0.35% C-0.4% Si-0.95% Mn-0.04% S-0.5% Cr-0.1% V by mass % as basic chemical compositions.

Therefore, there has been greatly increased a demand for a non-heat treated connecting rod having fracture splitting ability equal to or higher than that of actually used in Europe, and fatigue resistance equal to or higher than that of the said non-heat treated connecting rod with the basic chemical compositions of 0.35% C-0.4% Si-0.95% Mn-0.04% S-0.5% Cr-0.1% V by mass %, and excellent machinability. It is noted that the most typical method for increasing the machinability is to add Pb (lead) to the steel. However, from the viewpoint of protection of Earth's environment, a technique of increasing the machinability without the addition of Pb is required.

In Japanese Patent Laid-Open Publications Nos. 9-3589, 9-31594, 9-111412, 9-176785, 9-176786, 9-176787, 11-50184, 11-199967, 11-199968, 11-236643, 11-286746, 11-286750, 11-302778 and 2000-345298, a "low ductility non-heat treated steel", in which the chemical compositions of the steel were controlled to enhance the fracture splitting ability, or a "low ductility non-heat treated steel", in which the chemical compositions and carbosulfide of the steel were controlled to enhance the fracture splitting ability and machinability, have been disclosed. However, any non-heat treated steel proposed in these Japanese Patent Laid-Open publications fatigue resistance has not necessarily been considered enough.

Japanese Patent Laid-Open Publication No. 11-315340 discloses "steels for machine structural use excellent in fracture splitting ability and fatigue strength", whose fracture splitting ability was enhanced, by making ductile ferrite brittle by reducing the Mn content and by increasing V content at a low carbon area of 0.2%-0.35% by weight, and by dispersing coarse TiC particles. However, the steels for machine structural use proposed in this Japanese Patent Laid-Open Publication contains only S (Sulfur) of 0.01% to 0.2% by weight for enhancing machinability. Thus the machinability required for the connecting rods cannot necessarily be satisfied.

DISCLOSURE OF THE INVENTION

The present invention was made by taking the above mentioned present circumstances into consideration. The object of the present invention is to provide a non-heat treated connecting rod, excellent in machinability, fracture splitting ability and fatigue resistance, which is suitable for a connecting rod in automobile engines or the like, and uses a Pb non added steel (a non-leaded steel) as a material, and a method of manufacturing the same.

The gists of the present invention are the following (I) and (II), that is to say, a non-heat treated connecting rod and a method of manufacturing the non-heat treated connecting rod.

(I) A non-heat treated connecting rod which comprises, in % by mass, C: 0.25-0.35%, Si: 0.50-0.70%, Mn: 0.60-0.90%, P: 0.040-0.070%, S: 0.040-0.130%, Cr: 0.10-0.20%, V: 0.15-0.20%, Ti: 0.15-0.20% and N: 0.002-0.020%, with the balance being Fe and impurities, with chemical compositions being less than 0.80 in the value of Ceq stated by the following expression (1), the microstructure of the Big end of the said connecting rod being ferrite-pearlite, all-region hardness of the said Big end being 255-320 in Vickers hardness, ferrite-region hardness in the said ferrite-pearlite of the Big end being 250 or more in Vickers hardness and the ratio of the said ferrite-region hardness to the said all-region hardness of the said Big end being 0.80 or more;

$$Ceq=C+(Si/10)+(Mn/5)+(5Cr/22)+1.65V-(5S/7) \quad (1),$$

where an element symbol appearing in the expression (1) represents the contents in mass % of the corresponding elements in the steel.

(II) A method of manufacturing a non-heat treated connecting rod which comprises, in % by mass, C: 0.25-0.35%, Si: 0.50-0.70%, Mn: 0.60-0.90%, P: 0.040-0.070%, S: 0.040-0.130%, Cr: 0.10-0.20%, V: 0.15-0.20%, Ti: 0.15-0.20% and N: 0.002-0.020%, with the balance being Fe and impurities, with chemical compositions being less than 0.80 in the value of Ceq stated by the following expression (1), the microstructure of the Big end of the said connecting rod being ferrite-pearlite, all-region hardness of the said Big end being 255-320 in Vickers hardness, ferrite-region hardness in the said ferrite-pearlite of the Big end being 250 or more in Vickers hardness and the ratio of the said ferrite-region hardness to the said all-region hardness of the said Big end being 0.80 or more, the said method sequentially comprising the following steps (a) to (f):

(a) heating a steel having the said chemical compositions at 1200-1350° C.;

(b) hot forging a connecting rod body and a connecting rod cap at 900° C. or more into an integral forged material;

(c) hot coining of the Big end to the said integral forged material at a temperature of more than 800° C.;

(d) providing a notch on the Big end;

(e) fracture splitting the said integral forged material into a connecting rod body and a connecting rod cap from a portion where the said notch on the Big end was provided;

(f) assembling the said fracture split connecting rod body and the connecting rod cap;

$$Ceq=C+(Si/10)+(Mn/5)+(5Cr/22)+1.65V-(5S/7) \quad (1),$$

where an element symbol appearing in the expression (1) represents the contents in mass % of the corresponding elements in the steel.

In this description, "the invention (I)" means the said invention of the non-heat treated connecting rod according to (I), and "the invention (II)" means the said invention of the method of manufacturing the non-heat treated connecting rod according to (II). These inventions are sometimes called as "the present invention" in a generic name.

The ferrite-pearlite, in the present invention, means a mixed structure of ferrite and pearlite. The respective phases can be confirmed by observation using an optical microscope or an electron microscope.

The "all-region hardness" of a Big end means an average of hardness at Vickers hardness (HV) of a test force of 98.07 N, measured in four portions randomly selected on a surface cut vertically with respect to a forged axis.

The "ferrite-region hardness" (hardness of ferrite) means an average of hardness at Vickers hardness (HV) of a test force of 0.09807 N. It is noted that the ferrite of "ferrite-region hardness" in the present invention does not contain the ferrite which forms a pearlite phase with cementite.

The temperatures in the above-mentioned (a) to (c) mean values of surfaces of steels or integral forged materials.

MOST PREFERRED EMBODIMENTS FOR CARRYING OUT THE INVENTION

Figure 1:
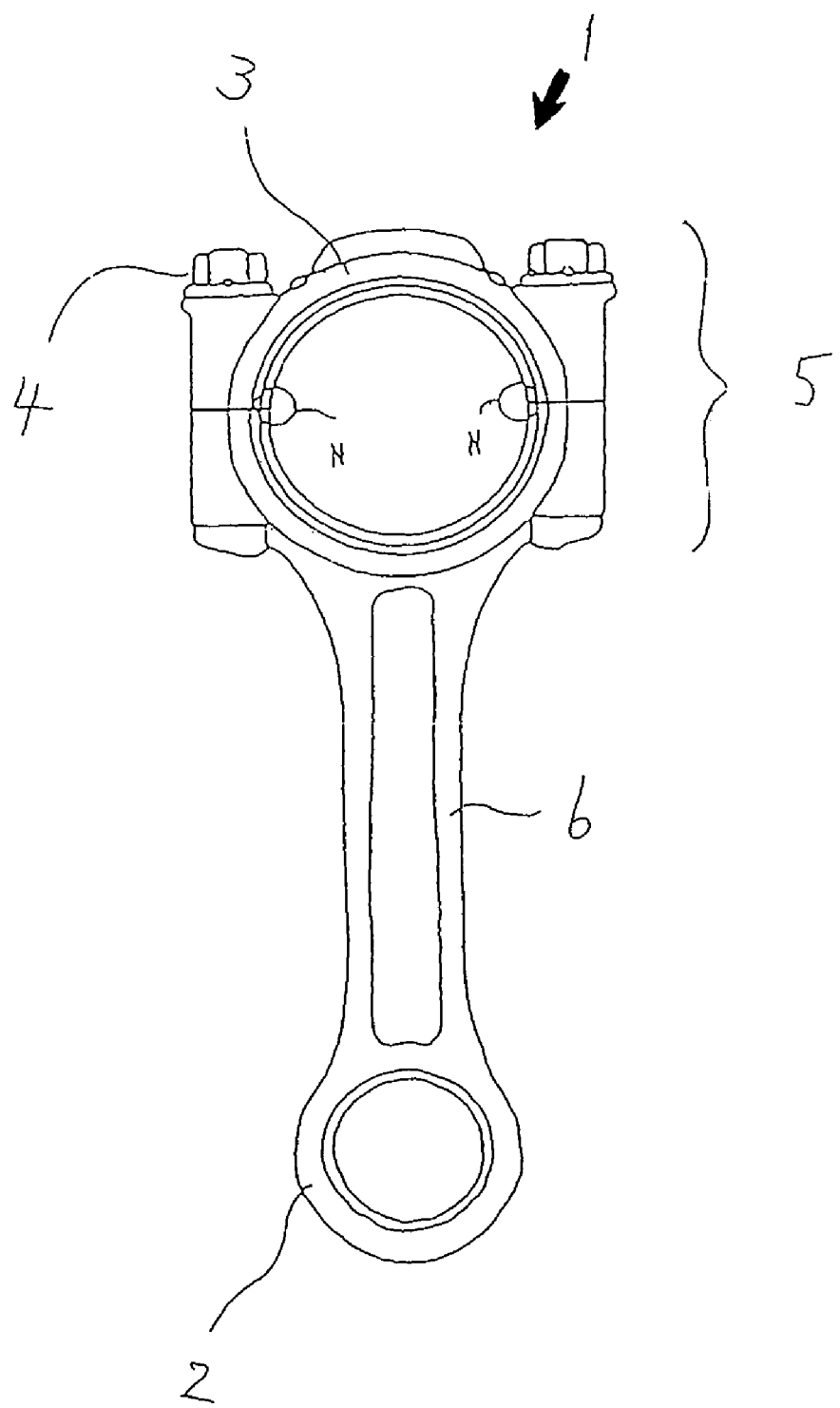
FIG. 1 is a view showing details of a connecting rod.

The present inventors have studied various methods to attain the above-mentioned objective and obtained the following knowledge (i) to (v).

(i) The microstructure of the steel in which both fracture splitting ability and machinability performed well was ferrite-pearlite.

(ii) The hardness of the ferrite in the ferrite-pearlite influences the fracture splitting ability, machinability and fatigue strength.

(iii) The fracture splitting ability in which the ratio of the ferrite-region hardness to the all-region hardness in ferrite-pearlite is large is good and great fatigue strength is obtained. Further, machinability is also good.

(iv) Since the ferrite is significantly strengthened by compositely adding suitable amounts of Ti and V, even if the value of the carbon equivalent (i.e. Ceq) stated by the said expression (1) is small, significant strength can be obtained. Consequently, large fatigue strength can be ensured even in a small Ceq area, and machinability is also good due to great strength of the ferrite.

(v) To ensure precipitation strengthening after the ferrite-pearlite transformation, Ti may be sufficiently dissolved in the matrix by heating before the hot forging and the cooling rate of the forged steel may be adjusted.

The present invention has been completed based on the above knowledge.

Each requirement of the present invention is described in detail as follows.

(A) Chemical Compositions of Steel

The "%" expressions for the contents of the respective elements mean "% by mass".

C: 0.25-0.35%

C (Carbon) enhances the strength of steel, and the effect can be obtained if the C content is 0.25% or more. However, if the C content exceeds 0.35%, the hardness of the steel is increased and the ratio of the ferrite is decreased so that the fatigue strength ratio, that is, the "fatigue strength (σw)/tensile strength (TS)", is decreased. Thus, although the hardness was increased, the fatigue strength is not sufficiently increased. On the contrary, since the hardness was increased, machinability is lowered. Therefore, the content of C is set to 0.25-0.35%.

Si: 0.50-0.70%

Si (Silicon) is effective for deoxidation of steel and enhances the strength of steel by solid-solution strengthening. When the content of Si is 0.50% or more sufficient effects can be obtained. However, if the content of Si exceeds 0.70%, the hot workability of the steel is reduced. Thus, a defect, such as cracking or the like is generated during the forging and an excessive load is exerted on a forging mold. Therefore, the content of Si is set to 0.50-0.70%.

Mn: 0.60-0.90%

Mn (Manganese) deoxidizes steel and also enhances the strength of steel by increasing hardenability. To sufficiently ensure these effects, the content of Mn must be 0.60% or more. However, if the content of Mn exceeds 0.90%, the hot workability of the steel is lowered and bainite may be generated and this decreases the fatigue strength, fracture splitting ability and machinability. Additionally, the component costs are also increased. Therefore, the content of Mn is set to 0.60-0.90%.

P: 0.040-0.070%

P (Phosphorus) precipitates at grain boundaries and makes steel brittle. Consequently, it creates a smooth brittle fracture surface on fracture splitting for a connecting rod. To sufficiently obtain this effect, the content of P must be 0.040% or more. However, if the content of P exceeds 0.070%, the hot workability of the steel is sometimes lowered. Therefore, the content of P is set to 0.040-0.070%.

S: 0.040-0.130%

S (Sulfur), together with Mn and/or Ti, forms sulfide and this enhances the machinability of steel. To obtain this effect the content of S must be 0.040% or more. However, if the content of S exceeds 0.130%, the hot workability of the steel is sometimes lowered. Therefore, the content of S is set to 0.040-0.130%. The S content is preferably more than 0.070% to 0.130%.

Cr: 0.10-0.20%

Cr (Chromium) increases the hardenability of steel and this enhances the strength. To sufficiently ensure this effect, the content of Cr must be 0.10% or more. However, if the content of Cr exceeds 0.20%, bainite is liable to be generated and the component costs are increased. Therefore, the content of Cr is set to 0.10-0.20%.

V: 0.15-0.20%

V (Vanadium) is an important element in the present invention. V enhances the strength of steel by being precipitated in ferrite as carbonitride, and further enhances the fracture splitting ability by being added together with Ti which will be described later. To sufficiently obtain these effects, the content of V must be 0.15% or more. However, if the content of V exceeds 0.20%, the component costs are increased. Therefore, the content of V is set to 0.15-0.20%.

Ti: 0.15-0.20%

Ti (Titanium) is an important element in the present invention because Ti is precipitated in ferrite as carbonitride in the same manner as V, which enhances the strength of the steel. It strengthens ferrite significantly by being added together with V. Since the strengthening of ferrite decreases the difference between the all-region hardness of ferrite-pearlite and the ferrite-region hardness, a good fracture splitting ability can be ensured. Further, the strengthening of ferrite ensures large fatigue strength. Additionally, Ti improves machinability of the steel by forming sulfide. To sufficiently obtain the above-mentioned effects, the content of Ti must be 0.15% or more. However, if the content of Ti exceeds 0.20%, the component costs are increased. Therefore, the content of Ti is set to 0.15-0.20%.

N: 0.002-0.020%

N (Nitrogen), together with V and/or Ti, forms carbonitride and this contributes to the strengthening of steel. To obtain this effect the content of N must be 0.002% or more. However, even if the content of N is more than 0.020%, the above-mentioned effect is saturated. Therefore, the content of N is set to 0.002-0.020%.

Value of Ceq: less than 0.80

When the value of Ceq, stated by the said expression (1) is large, the machinability of the connecting rod is generally lower, and when the value of Ceq is small, the strength is lower so the fatigue strength is also decreased. However, in the case of a material, according to the present invention, in which the said amounts of Ti and V are contained, ferrite is significantly strengthened. Thus, even in a case where the value of Ceq, stated by the said expression (1) is small, large strength can be obtained and machinability is also improved by the large strength of ferrite. It should be noted that even in the case of ferrite-strengthened material according to the present invention in which the said amounts of Ti and V are present, when the value of Ceq is 0.80 or more, large fatigue strength can be ensured but machinability is liable to be lower. Therefore, the value of Ceq stated by the said expression (1) is set to less than 0.80. It should be noted that the lower limit value of the Ceq is appropriately 0.60, although it depends on the strength required for the connecting rod.

(B) Microstructure and Hardness of Big End of Connecting Rod (B-1) Microstructure of Big End The microstructure of the Big end of a non-heat treated connecting rod, according to the present invention, must be ferrite-pearlite. This is due to the fact that the ferrite-pearlite microstructure improves the fracture splitting ability and machinability of the connecting rod. Therefore the fracture splitting at the Big end is facilitated and the boring of the hole for bolt is also facilitated. The fracture splitting ability of a microstructure containing martensite, bainite and austenite is low and inferior to the ferrite-pearlite microstructure in machinability. Therefore, in the non-heat treated connecting rod, according to the present invention, the microstructure of the Big end is set using ferrite-pearlite. Here, as mentioned above, the "ferrite-pearlite" means a mixed microstructure of ferrite and pearlite.

(B-2) All-region Hardness, Ferrite-region Hardness in Ferrite-pearlite and Ratio of Ferrite-region Hardness to All-region Hardness in Big End In the Big end of a non-heat treated connecting rod, according to the present invention, the all-region hardness must be 255-320 at Vickers hardness (HV), the ferrite-region hardness in the ferrite-pearlite must be 250 or more at Vickers hardness (HV), and the ratio of the said ferrite-region hardness to all-region hardness must be 0.8 or more.

First, when the all-region hardness of the Big end is less than 255 HV, fatigue strength and fracture splitting ability are lowered, on the other hand, when it exceeds 320 HV, large fatigue strength and good fracture splitting ability can be ensured. However, machinability is liable to be lower.

Next, the ferrite-region hardness in the ferrite-pearlite influences fracture splitting ability, machinability and fatigue strength. The ferrite-region hardness of 250 HV or more is necessary to ensure excellent fracture splitting ability, machinability and large fatigue strength.

Further, by decreasing the difference between the ferrite-region hardness in ferrite-pearlite and all-region hardness of the Big end, in other words, by increasing the ratio of the ferrite-region hardness to the all-region hardness, increasing the ratio to 0.80 or more ensures good fracture splitting ability, large fatigue strength and good machinability.

Therefore, with the Big end of the non-heat treated connecting rod, according to the present invention, the all-region hardness is set to 255-320 HV, the ferrite-region hardness in the ferrite-pearlite is set to 250 HV or more, and the ratio of the said ferrite-region hardness to the all-region hardness is set to 0.80 or more.

Here, as mentioned already, the all-region hardness of the Big end means an average value in a case where hardness of the surface of the Big end, cut off vertically with respect to a forged axis, was measured at four points at random. The Vickers hardness in "all-region hardness" of the Big end means values measured by a test force of 98.07 N, and the Vickers hardness in "ferrite-region hardness" in the ferrite-pearlite means values measured by a test force of 0.09807 N.

Also as mentioned, the ferrite in the present invention does not contain the ferrite which forms pearlite phase with cementite.

The said invention (I) is a non-heat treated connecting rod, which satisfies the requirements of the above-mentioned terms (A) and (B).

(C) Conditions of Manufacturing Connecting Rod

To obtain the non-heat treated connecting rod, according to the said invention (I), is comparatively easy, it may be manufactured by a method comprising the steps of the above-mentioned (a) to (f) in this order.

Thus, the present invention (II) is set to a following method of manufacturing a non-heat treated connecting rod. The steel having the chemical compositions described in the said term (A) is melted by a usual method in order to make such as steel ingots or billets. Some of them are hot rolled and/or hot forged by a usual method. Then they are split to a connecting rod body and a connecting rod cap, by steps including the steps of the said (a) to (e) in this order, and then a step (f) is performed to connect the fracture splitting connecting rod body and the connecting rod cap to a crankshaft for assembling.

Step (a) is a heating process for hot forging an integral object of a connecting rod body and connecting rod cap. If a heating temperature for forging is less than 1200° C., the dissolution of Ti to the matrix becomes insufficient. Thus even if the steel has the Ti and V compositely added chemical compositions described in the said term (A), significant strengthening of ferrite is not attained and the desired excellent fracture splitting ability and large fatigue strength may not be obtained. On the other hand, if the heating temperature exceeds 1350° C., an excessive load is exerted on a heating furnace and scale loss is increased thereby increasing the cost. Thus, the heating temperature of the steel, having the chemical compositions described in the said term (A), may be 1200-1350° C.

Therefore, in the present invention (II), the temperature of a heating process (a) is set to 1200-1350° C.

Step (b) is hot forging process for processing steel into an integral object of the connecting rod body and connecting rod cap. If the forging temperature is less than 900° C., deformation resistance of the material (material to be forged) is increased, which can lead to a decrease in the life of the forging mold. Further, since the ferrite-pearlite transformation is performed while the recrystallization of the austenite grain is not sufficiently attained, the microstructure become finer. Therefore the fracture splitting ability can be lowered by an increase in toughness. The fatigue strength and fracture splitting ability can be lowered by a decrease in the all-region hardness of the big end and/or the ferrite-region hardness in the ferrite-pearlite. Thus, the hot forging the steel into an integral object of the connecting rod body and connecting rod cap may be performed at a temperature of 900° C. or more.

Therefore, in the invention (II), the hot forging temperature of (b) is set to 900° C. or more. It is noted that this forging is preferably formed at 1050° C. or more. The substantial upper limit of the hot forging temperature is about 1250° C., while the heating temperature is between 1200 and 1350° C.

Step (c) is a hot coining process, which is performed over a Big end for satisfying a predetermined dimensional tolerance. The coining process on a Big end is usually performed at cold conditions. But the coining of the Big end at a low temperature such as 800° C. or less can make lower a fittingness of fracture surfaces faced each other which are generated by the later performed fracture splitting into two parts. This fittingness lowering of fracture surfaces faced each other is caused by releasing a residual stress generated in the coining process during the fracture splitting process. If this fitting lowering of fracture surfaces of the Big end occurs, the machining of its fracture surfaces may be needed before they are connected when a connecting rod body and a connecting rod cap are assembled to connect a crankshaft in sandwiching it between them. This machining process increase steps of manufacturing process and increase the cost. Therefore, to satisfy the predetermined dimensional tolerance, the coining process performed on the Big end may be carried out at a temperature of more than 800° C.

Therefore in the invention (II), the coining process (c) performed on the Big end is set to carrying out at a temperature of more than 800° C.

It is noted that if the steel, having the chemical compositions described in the said term (A), is subjected to the steps mentioned in the said (a) to (c) and the cooling, after the hot coining in the step (c), is atmospheric cooling, a microstructure and hardness at the Big end of the non-heat treated connecting rod, described in the term (B), can be easily obtained.

As mentioned above, the temperatures in the steps (a) to (c) are indicated by values on the surfaces of the steel and the integral forged materials.

It is noted that the invention (II) does not define the coining temperature on portions other than the Big end. The coining process on portions other than the Big end may be performed under hot conditions, or under cold conditions as usual.

A notch may be provided on the Big end, in order to limit the origin of the generation of the fracture splitting on the fracture splitting treatment, to perform the fracture splitting of an integral forged material easily and reliably, and to make the fracture split fracture surface smooth and brittle easily and reliably.

Therefore, in the invention (II), a notch is provided on the Big end in step (d). It is noted that a stress concentration factor for the notch provided on the Big end is extremely preferable 2 or more, and the notch provided on the Big end is preferably provided at the N portions in FIG. 1.

Step (e) is a process for splitting an integral forged material into a connecting rod body and a connecting rod cap. This process is not particularly limited and it may be performed by an ordinary method of manufacturing a connecting rod.

Step (f) is a process for connecting the connecting rod body and connecting rod cap, split by the fracture splitting to a crankshaft for assemble. This process is not particularly limited and it may be performed by an ordinary method of manufacturing a fracture splitting connecting rod.

It is noted that the bolt hole work in order to connect the connecting rod body and the connecting rod cap may be performed before step (d), at the same time of step (d) or before the fracture splitting step (e)

EXAMPLE

Next, the present invention will be more concretely described by examples but the present invention is not limited to these examples.

Steels having chemical compositions shown in Table 1 were melted by use of a 3 ton electric furnace in an ordinary manner, and steel ingots were obtained.

In table 1, the steels Nos. 3 to 5 and 10 to 12 are examples of the present invention, whose chemical compositions are within the ranges defined in the present invention. On the other hand, the steels Nos. 1, 2 and 6 to 9 are comparative examples in which any of them, whose chemical compositions are out of their content ranges defined in the present invention. It is noted that the steel No. 1 substantially corresponds to the steel for a fracture splitting connecting rod which was disclosed by U.S. Pat. No. 5,135,587 and which has been actually used in Europe, and the steel No. 2 has the basic chemical compositions of 0.35% C-0.4% Si-0.95% Mn-0.04% S-0.5% Cr-0.1% V to which Pb and Ca were added for the purpose of improving machinability, for a non-heat treated connecting rod used in certain kinds of automobiles.

TABLE 2

| Test No. | Steel No. | Hot-forging heating temperature (° C.) | Hot-forging finishing temperature (° C.) | Coining temperature (° C.) | Stress concentration factor of notch |
|---|---|---|---|---|---|
| 1 | *1 | 1250 | 1150 | 950 ± 50 | 3 |
| 2 | *2 | 1250 | 1150 | 950 ± 50 | 3 |
| 3 | 3 | 1250 | 1150 | 950 ± 50 | 3 |
| 4 | 4 | 1250 | 1150 | 950 ± 50 | 3 |
| 5 | 5 | 1250 | 1150 | 950 ± 50 | 3 |
| 6 | *6 | 1250 | 1150 | 950 ± 50 | 3 |
| 7 | *7 | 1250 | 1150 | 950 ± 50 | 3 |
| 8 | *8 | 1250 | 1150 | 950 ± 50 | 3 |
| 9 | *9 | 1250 | 1150 | 950 ± 50 | 3 |
| 10 | 10 | (+) 1150 | 1050 | 950 ± 50 | 3 |
| 11 | 11 | 1250 | (+) 800 | 950 ± 50 | 3 |
| 12 | 12 | 1250 | 1150 | 950 ± 50 | 5 |

Note:
The mark * shows a steel out of range defined in the present invention in terms of its chemical composition.
The mark (+) shows out of range defined in the invention (II).

Microstructure, Vickers hardness (hereinafter referred to as Hv Hardness), tensile properties, fatigue resistance, machinability, and the fracture splitting ability were checked by the use of each of the integral forged materials with notches.

A testing piece for observation of a microstructure, which has a surface vertical to a forged axis used as an observation surface, was cut off from the Big end of each of the integral forged materials, and was mirror-like polished and nital

TABLE 1

| Steel No. | Chemical Compositions (mass %) Balance: Fe and impurities | | | | | | | | | | | |
|---|---|---|---|---|---|---|---|---|---|---|---|---|
| | C | • Si | Mn | P | S | Cr | Ti | V | N | Pb | Ca | Ceq |
| 1 | *0.72 | *0.19 | *0.52 | *0.010 | 0.055 | 0.13 | *— | *0.03 | 0.015 | — | — | *0.883 |
| 2 | 0.34 | *0.41 | *0.94 | *0.016 | 0.042 | *0.52 | *— | *0.09 | 0.010 | *0.25 | *0.001 | *0.806 |
| 3 | 0.30 | 0.63 | 0.75 | 0.066 | 0.100 | 0.17 | 0.17 | 0.18 | 0.005 | — | — | 0.777 |
| 4 | 0.25 | 0.69 | 0.75 | 0.059 | 0.060 | 0.15 | 0.16 | 0.15 | 0.004 | — | — | 0.708 |
| 5 | 0.27 | 0.54 | 0.72 | 0.048 | 0.100 | 0.12 | 0.16 | 0.16 | 0.006 | — | — | 0.688 |
| 6 | *0.18 | 0.70 | 0.75 | 0.047 | 0.064 | 0.16 | 0.19 | 0.19 | 0.005 | — | — | 0.704 |
| 7 | *0.45 | 0.65 | 0.75 | 0.052 | 0.080 | 0.16 | 0.17 | 0.17 | 0.007 | — | — | *0.925 |
| 8 | 0.34 | 0.65 | 0.70 | 0.060 | 0.098 | 0.19 | *0.05 | 0.18 | 0.007 | — | — | *0.815 |
| 9 | 0.30 | 0.70 | 0.77 | 0.061 | 0.073 | 0.15 | 0.17 | *0.08 | 0.004 | — | — | 0.638 |
| 10 | 0.30 | 0.63 | 0.75 | 0.066 | 0.100 | 0.17 | 0.17 | 0.18 | 0.005 | — | — | 0.777 |
| 11 | 0.26 | 0.54 | 0.60 | 0.051 | 0.099 | 0.12 | 0.16 | 0.16 | 0.006 | — | — | 0.655 |
| 12 | 0.30 | 0.63 | 0.75 | 0.066 | 0.100 | 0.17 | 0.17 | 0.18 | 0.005 | — | — | 0.777 |

$Ceq = C + (Si/10) + (Mn/5) + (5Cr/22) + 1.65 V - (5S/7)$
Note:
The mark * shows out of range defined in the present invention.

Then, these steels in the examples of the present invention and the steels in comparative examples were made into billets by an ordinary method, and then these billets were hot rolled to produce round bars of a diameter of 35 mm.

By using the obtained round bars of a diameter of 35 mm as materials, integral forming forging of a connecting rod body and a connecting rod cap, and a coining process of the Big end were performed.

Table 2 shows the conditions of the above-mentioned integral forming forging and coining process of the Big end. It is noted that the cooling following the hot coining of the Big end was atmospheric cooling.

Then the coining of portions other than the Big end was performed under cold conditions. Further, a notch having the stress concentration factor shown in Table 2 was provided at the N portion of the Bid end in FIG. 1.

etched. After that the piece was observed by an optical microscope of a magnification of 400 times to determine the microstructure.

With each of the testing pieces having the microstructure of the ferrite-pearlite, the ferrite-region hardness in the ferrite-pearlite was measured by a test force of 0.09807 N.

Further, a testing piece, which has a surface vertical to a forged axis used as a testing surface, was cut off from the Big end of each of the integral forged materials, and was mirror-like polished. After that the all-region hardness was measured by a test force of 98.07 N.

With each of the integral forged materials, having the testing pieces which show the microstructure of the ferrite-pearlite, test pieces described as 14A test pieces in JIS Z 2201, having a diameter in a parallel portion of 3.00 mm, were cut off from the I-beam section [6] (see FIG. 1) in a connecting rod body [2] of the integral forged material and tensile tests were conducted at room temperature, in order to measure each average tensile strength (TS).

Also with each of the integral forged materials, having the testing pieces which show the microstructure of the ferrite-pearlite, fatigue test pieces, having a diameter of 3 mm and a length of 11 mm in a parallel portion, were cut off from the I-beam section [6] (see FIG. 1) in a connecting rod body [2] of the integral forged material. Fatigue tests, by a load controlled reversed axial loading, were carried out at room temperature in order to measure the fatigue strength ($\sigma w$) by use of an electric hydraulic servo fatigue testing machine, set at a stress ratio to −1 and a repeated speed from 10 to 20 Hz. A fatigue strength ratio ($\sigma w/TS$) was obtained from this $\sigma w$ and TS.

It is noted that the value (374 MPa) of $\sigma w$ of the test No. 2, which uses the steel No. 2, was set to a reference performance and if a value of more than the $\sigma w$ was obtained, the fatigue resistance was determined to be acceptable.

Assuming bolt hole working, the machinability was evaluated by drilling the Big end of each integral forged material to form a through hole, producing 300 through holes and measuring the amount of wear in the corner of the drill (that is an amount of wear of the outermost peripheral portion of the drill). It is noted the amount of wear in the corner of the drill in the case of a test No. 2, using the steel No. 2 in which Pb and Ca were added in order to improve machinability, and which corresponds to a steel for a non-heat treated connecting rod used in certain kinds of automobiles, was set to the reference value. If the amount of wear is 110% or less of the reference value, the machinability was evaluated as "○", and if it exceeded 110% of the reference value, the machinability was evaluated as "X". This is because it is impossible to consider that the machinability of a steel which does not contain Pb or Ca is remarkably improved, as compared to the machinability of the steel No. 2, which does contain Pb and Ca. It was judged that if the amount of wear is 110% or less of the reference value, it is possible to produce the non-heat treated connecting rod on an industrial scale.

The drilling test conditions are as follows.

Drill: Straight shank drill of a carbide tool of P 20 having a diameter of 8 mm;

The number of revolutions: 1200 rpm;
Feed: 0.15 mm/rev
Lubrication: Water soluble lubricant.

Further, each integral forged material, in which bolt holes were worked at the Big end, was fracture split into a connecting rod body and a connecting rod cap by an ordinary drop-weight method. It is noted that only the integral forged material made of the steel No. 2 could not be fracture split into a connecting rod body and a connecting rod cap by the drop-weight method.

Figure 2:
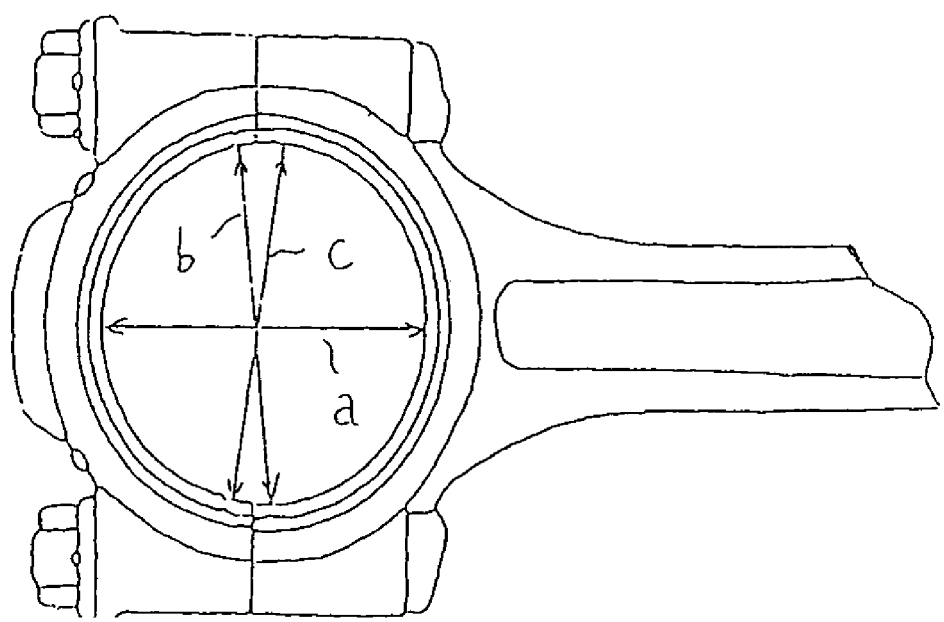
FIG. 2 is a view explaining portions of the dimension measurement for introducing the amount of fracture strain.

After fracture splitting, the fracture splitting ability was evaluated by observing the fracture surface and measuring the amount of fracture strain. When the fracture surface has the same fracture surface as in a case where the steel No. 1 substantially corresponding to a steel for the fracture splitting connecting rod, which has been actually used in Europe, and when the amount of fracture strain is smaller than 0.15 mm, which is an amount of fracture strain in the case where the steel No. 1 is used as a material, the fracture splitting ability was evaluated as good. It is noted that when the values of "a" to "c" shown in FIG. 2 were measured, the amount of fracture strain means the value obtained by subtracting a value of "a−[(b+c)/2]" before fracture splitting, from a value of "a−[(b+c)/2]" after fracture splitting.

The above-mentioned respective test results were shown in Table 3 together.

In Table 3, "αHv" denotes the ferrite-region hardness in the ferrite-pearlite phase in the Big end at Vickers hardness, and "THv" denotes the all-region hardness of the Big end at Vickers hardness.

It is noted that since the microstructure of the test No. 1 was not ferrite-pearlite, the ferrite hardness was not measured. Thus a space for the "αHv" was shown as "-".

Further, in the test No. 7, since the ferrite area was small, an indenter partially covered pearlite also at a test force of 0.09807N whereby the hardness of single ferrite could not be measured. Thus, the space for "αHv" was shown as "$".

Finally, since the microstructure of the test No. 1 was not ferrite-pearlite, tensile properties and fatigue resistance were not checked and a space for "TS" and a space for "$\sigma w$" were shown as "-".

TABLE 3

| | | | | | | | | | | | |
|---|---|---|---|---|---|---|---|---|---|---|---|
| | | | | | | Mechanical properties | | | | | |
| Test No. | Steel | Micro-structure of Big end | THv | α HV | αHv / THv | TS (Mpa) | σ w (Mpa) | σw / TS | Fracture surface form | Amount of fracture strain (mm) | Machinability |
| 1 | *1 | *P | 285 | — | — | — | — | — | Brittleness + Ductility | 0.15 | ** X |
| 2 | *2 | F + P | 290 | *220 | *0.759 | 880 | 374 | 0.425 | — | — | # |
| 3 | 3 | F + P | 300 | 275 | 0.917 | 960 | 446 | 0.465 | Brittleness | 0.10 | ○ |
| 4 | 4 | F + P | 280 | 260 | 0.929 | 890 | 423 | 0.475 | Brittleness | 0.13 | ○ |
| 5 | 5 | F + P | 275 | 260 | 0.945 | 870 | 414 | 0.476 | Brittleness | 0.13 | ○ |
| 6 | *6 | F + P | 280 | *245 | 0.875 | 780 | 387 | 0.496 | Brittleness + Ductility | **0.30 | ○ |
| 7 | *7 | F + P | *345 | $ | — | 1080 | 468 | 0.433 | Brittleness | 0.06 | ** X |
| 8 | *8 | F + P | *330 | 260 | *0.788 | 1040 | 450 | 0.433 | Brittleness + Ductility | **0.20 | ○ |
| 9 | *9 | F + P | 270 | *230 | 0.852 | 850 | **351 | 0.413 | Brittleness + Ductility | **0.25 | ○ |
| 10 | 10 | F + P | 275 | *240 | 0.873 | 870 | **369 | 0.424 | Brittleness + Ductility | **0.30 | ○ |

TABLE 3-continued

| Test No. | Steel | Micro-structure of Big end | THv | α HV | αHv/THv | TS (Mpa) | σw (Mpa) | σw/TS | Fracture surface form | Amount of fracture strain (mm) | Machinability |
|---|---|---|---|---|---|---|---|---|---|---|---|
| 11 | 11 | F + P | *250 | *220 | 0.880 | 810 | **356 | 0.440 | Brittleness + Ductility | **0.30 | ○ |
| 12 | 12 | F + P | 300 | 275 | 0.917 | 960 | 446 | 0.465 | Brittleness | 0.04 | ○ |

In the spaces of microstructures, "F" shows ferrite and "P" shows pearlite.
The "—" in a space of "α Hv" shows that the ferrite-region hardness is not measured because of the microstructure other than "F + P" and the "$" shows that the single hardness of ferrite could not be measured at a test force of 0.09807 N.
The "—" in a fracture surface form which shows that no fracture was performed, and the "brittleness + ductility" shows partially mixing of a ductile fracture surface.
The "#" in a space of machinability shows a criterion.
The mark * shows out of the conditions defined in the present invention.
The mark ** shows the inability of attaining the target.

As apparent from Table 3, in all cases of the test Nos. 3 to 5 and the test No. 12, each having the chemical compositions defined in the present invention and having the microstructure, all-region hardness, ferrite-region hardness and the ratio of ferrite-region hardness to all-region hardness in the Big end, targeted machinability, fracture splitting ability and fatigue resistance, were obtained.

In the case of the test No. 12 among the test Nos. 2 to 5 and 12, a notch having a large stress concentration factor was provided. Thus, the fracture splitting ability is extremely good.

On the contrary, in the case of test Nos. 6 to 9, at least chemical compositions are out of the conditions defined in the present invention, and any one or more of the machinability, fracture splitting ability and fatigue resistance do not attain the target.

In the case of test No. 1, using the steel No. 1, which substantially corresponds to a steel for the fracture splitting connecting rod, which has been actually used in Europe, the amount of wear in the corner of the drill exceeds 110% of the reference value and the machinability is "x", which did not attain the target.

Further, In the case of test No. 2, using the steel No. 2 obtained by adding Pb and Ca to a steel for the purpose of improving the machinability, which corresponds to a steel for a non-heat treated connecting rod, which has been used in certain kinds of automobiles, the integral formed material cannot be fracture split to a connecting rod body and a connecting rod cap by the drop-weight method and the fracture splitting ability is poor.

On the other hand, in the case of test No. 10, although the steel No. 10 has the chemical compositions defined in the present invention, the ferrite-region hardness in the ferrite-pearlite of the Big end is out of the condition defined in the present invention. Thus, the fracture splitting ability and fatigue resistance are poor.

Also in the case of test No. 11, although the steel No. 11 has the chemical compositions defined in the present invention, the all-region hardness and the ferrite-region hardness are out of the conditions defined in the present invention. Thus the fracture splitting ability and fatigue resistance are poor.

INDUSTRIAL APPLICABILITY

According to the present invention, the non-heat treated connecting rod whose material is a non Pb added (non-leaded) steel, has excellent machinability, fracture splitting ability and fatigue resistance, and can be utilized as a connecting rod in automobile engines or the like. This non-heat treated connecting rod can be comparatively easily manufactured by the method of the present invention.

What is claimed is:

1. A non-heat treated fracture splitting connecting rod which comprises, in % by mass, C: 0.25 to 0.35%, Si: 0.50 to 0.70%, Mn: 0.60 to 0.90%, P: 0.040 to 0.070 %, S: 0.040 to 0.130%, Cr: 0.10 to 0.20%, V: 0.15 to 0.20%, Ti: 0.15 to 0.20% and N: 0.002 to 0.020%, with the balance being Fe and impurities, with chemical compositions being less than 0.80 in the value of Ceq stated by the following expression (1), the microstructure of the big end of the said connecting rod being ferrite-pearlite, all-region hardness of the said big end being 255 to 320 in Vickers hardness, the ferrite-region hardness in the said ferrite-pearlite of the big end being 250 or more in Vickers hardness and the ratio of the said ferrite-region hardness to the said all-region hardness of said big end being 0.80 or more;

$$Ceq=C+(Si/10)+(Mn/5)+(5Cr/22)+1.65V-(5S/7) \quad (1),$$

where an element symbol appearing in the expression (1) represents the contents in mass % of the corresponding elements in the steel.

2. A method of manufacturing a non-heat treated connecting rod which comprises, in % by mass, C: 0.25 to 0.35%, Si: 0.50 to 0.70 %, Mn: 0.60 to 0.90%, P: 0.040 to 0.070%, S: 0.040 to 0.130%, Cr: 0.10 to 0.20%, V: 0. 15 to 0.20%, Ti: 0.15 to 0.20% and N: 0.002 to 0.020 %, with the balance being Fe and impurities, with chemical compositions being less than 0.80 in the value of Ceq stated by the following expression (1), the microstructure of the big end of the said connecting rod being ferrite-pearlite, all-region hardness of the said big end being 255 to 320 in Vickers hardness, the ferrite-region hardness In the said ferrite-pearlite of the Big end being 250 or more in Vickers hardness and the ratio of the said ferrite-region hardness to the said all-region hardness of the said big end being 0.80 or more, the said method sequentially comprising the following steps (a) to (f):
(a) heating a steel having the said chemical compositions at 1200 to 1350° C.;
(b) hot forging a connecting rod body and a connecting rod cap at 900° C. or more into an integral forged material;
(c) hot coining of the big end at a temperature of more than 800° C.;
(d) providing a notch on the big end;
(e) fracture splitting into a connecting rod body and a connecting rod cap from a portion where the said notch on the big end was provided;
(f) assembling the said fracture split connecting rod body and the connecting rod cap;

$$Ceq=C+(Si/10)+(Mn/5)+(5Cr/22)+1.65V-(5S/7) \quad (1),$$

where an element symbol appearing in the expression (1) represents the contents in mass % of the corresponding elements in the steel.

* * * * *